United States Patent

Lines

[11] Patent Number: 4,588,139
[45] Date of Patent: May 13, 1986

[54] APPARATUS FOR WINDING FISHING LINE ONTO A FISHING REEL

[76] Inventor: Jennifer Lines, Duart Fairylands, 6 Mills Shares Rd., Pembroke, Bermuda

[21] Appl. No.: 653,499

[22] Filed: Sep. 21, 1984

[51] Int. Cl.[4] .................. A01K 89/00; B65H 75/00
[52] U.S. Cl. ..................... 242/84.1 M; 242/54 R; 242/84.1 R
[58] Field of Search ............. 242/59 R, 106, 84.1 R, 242/84.1 A, 84.1 M, 68.4, 84.2 R

[56] References Cited

U.S. PATENT DOCUMENTS

| | | | |
|---|---|---|---|
| 698,029 | 4/1902 | Krueger-Hoffman | 242/84.43 |
| 2,514,929 | 7/1950 | Brandt | 242/84.43 |
| 3,026,059 | 3/1962 | Dennler | 242/106 X |
| 3,030,046 | 4/1962 | Markoff-Moghadam | 242/84.1 A X |
| 3,136,066 | 6/1964 | Spinn | 242/84.1 M X |
| 3,216,145 | 11/1965 | Aunspaugh | 242/84.1 A X |
| 3,704,840 | 12/1972 | Haddock | 242/84.2 R |
| 4,007,886 | 2/1977 | Kaminstein | 242/106 X |

Primary Examiner—John M. Jillions
Assistant Examiner—Lynn M. Sohacki
Attorney, Agent, or Firm—Dann, Dorfman, Herrell and Skillman

[57] ABSTRACT

An apparatus for winding fishing line from a supply spool onto either a crank-type or a crankless reel is provided. A spindle is provided on the frame of the apparatus for supporting the supply spool in a freely rotatable position on the frame. A motor-driven reel rotor is provided on the frame for engaging and winding either the crank-type reel or the crankless reel so that the fishing line may be wound onto the reel. A fishing reel support member is mountable on the frame alternatively in a first orientation for supporting a crank-type reel or a second orientation for supporting a crankless reel. Guide elements are provided on the frame guide the fishing line from the supply spool onto the respective fishing reel mounted on the frame, and a measuring device is associated with the measure of the length of line wound on the reel.

25 Claims, 6 Drawing Figures

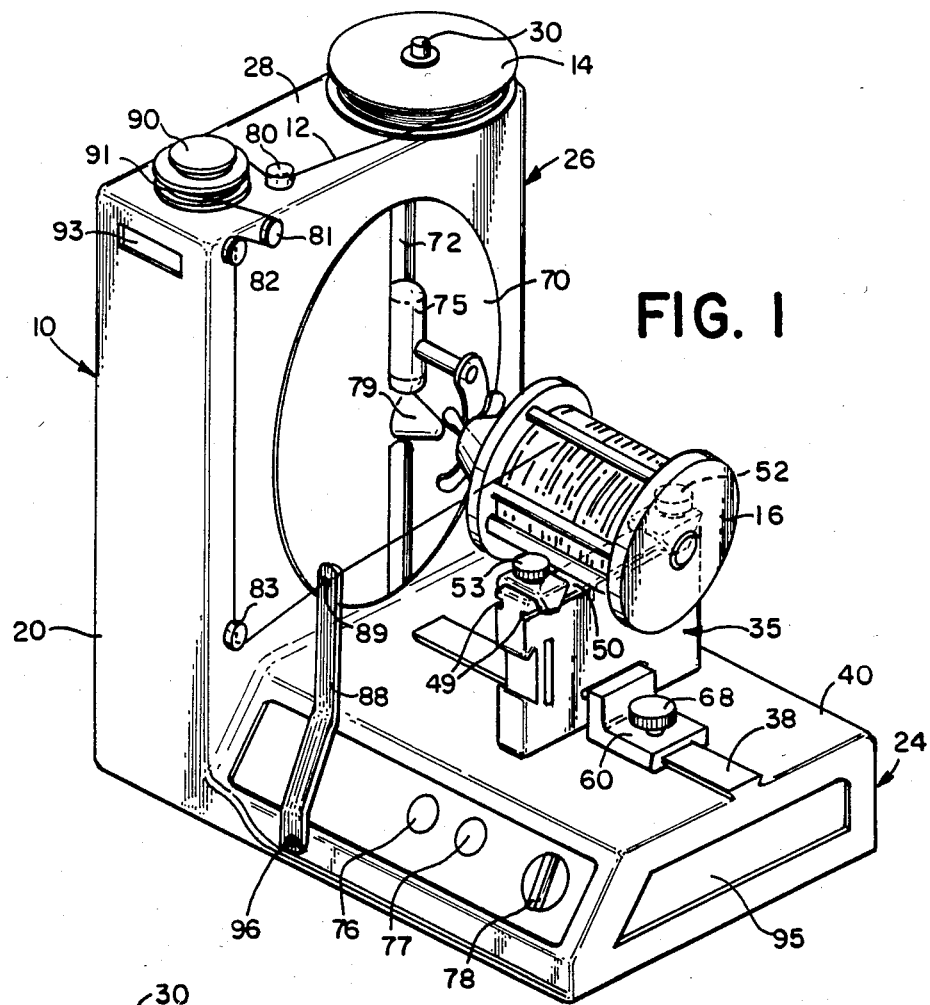
FIG. 1
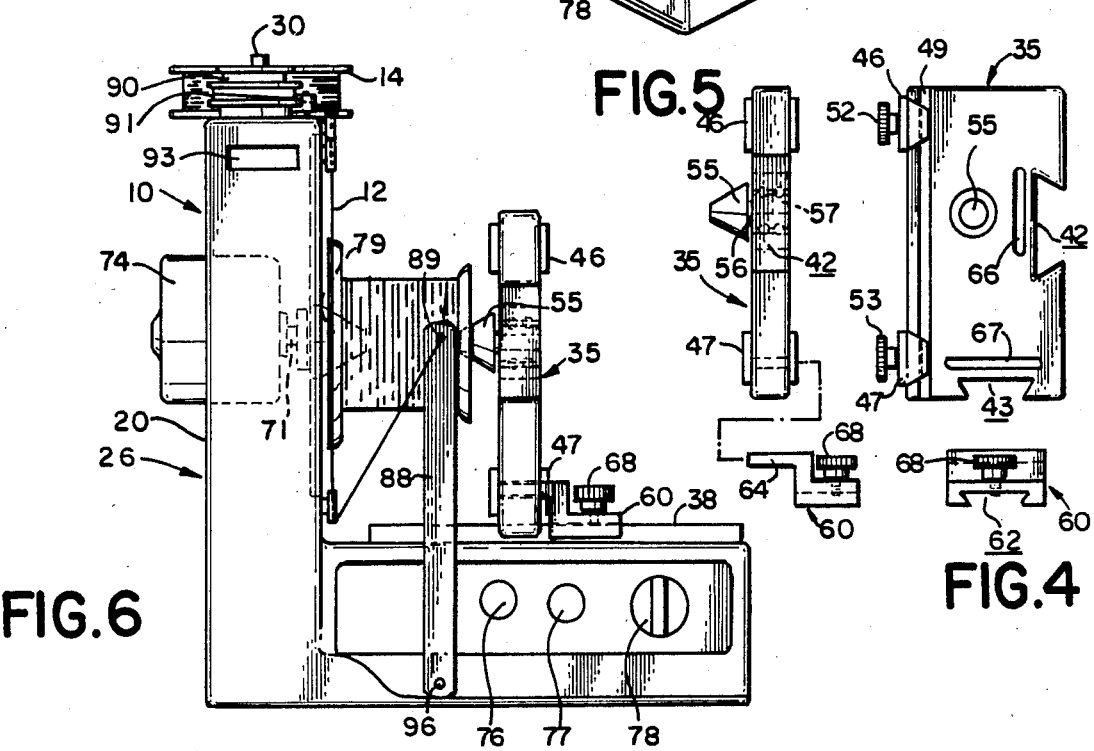
FIG. 5
FIG. 6
FIG. 4

APPARATUS FOR WINDING FISHING LINE ONTO A FISHING REEL

FIELD OF THE INVENTION

The present invention relates to an apparatus for winding fishing line onto a fishing reel and, more particularly, to an apparatus for winding fishing line from a supply spool onto either a crank-type reel or a crankless reel.

BACKGROUND OF THE INVENTION

Winding fishing line from a supply spool onto a fishing reel by hand is a burdensome and time consuming process. To expedite the winding process, fishing reel winders have been developed for automatically winding fishing line from a supply spool onto a fishing reel. Typically, some type of conventional support system is employed so that the fishing reel can be supported on the reel winder at a desired position and location. A motor-driven winding element is also provided on the reel winder for engaging and winding the fishing reel so that the fishing line from the supply spool can be automatically wound onto the reel.

One of the problems associated with using conventional reel winders is the limited capacity of the winders for accepting different sizes and styles of fishing reels. Requiring the use of a different reel winder for each type of fishing reel is impractical and expensive. Conversion of the conventional reel winders is sometimes possible. For example, the conventional reel winders, which can be adapted to receive both crank-type reels and crankless reels, often require significant modifications to the reel support structure in order to properly hold and support the respective reel in the appropriate position. In addition, significant changes to the reel winding element are also required so that the winding element properly engages and winds the respective reel. It is not uncommon for the conversion to require completely different elements or parts for both the reel support structure and the winding element. When any significant structural modifications to either the winding element or the reel support structure are required, conversion of the reel winder to accept a different style of fishing reel becomes burdensome. The different support structures and winding elements needed for different styles of reels often require the complete or substantial disassembly and reassembly of the appropriate reel support structures and also require the substitution of completely different winding elements. The required substitution of parts in either the support structure or the winding element creates the further problem that the additional parts must be properly stored when not in use. Even with prudent care, the disassembled parts may easily become lost in the sometimes hectic environment in which reel winders are used.

With respect to user safety, conventional reel winders employ motor-driven winding elements which typically protrude outwardly from the frame of the reel winder. A motor-driven T-bar is typically used as the winding element for engaging and winding the handle of a crank-type fishing reel. The conventional T-bar winding element includes a motor-driven shaft and an exposed transversely mounted crossbar for engaging and winding the handle of a crank-type fishing reel. If the fishing reel is not in proper position when the reel winder is turned on, the motor-driven rotation of the exposed unengaged crossbar creates a potential hazard for the unwary user.

Another minor inconvenience which confronts users of conventional reel winders is that the length of fishing line being wound onto the fishing reel is typically only measured in a single unit of length measurement. If the user wishes to convert the measurement to a different scale, such as between feet and meters, either hand calculations or a calculator must be employed.

In accordance with the present invention, an apparatus for winding fishing line onto a fishing reel is provided which overcomes the inefficiencies and hazards of the conventional reel winders. The apparatus in accordance with the present invention is conveniently adaptable to handle both crank-type and crankless reels and is both easy and safe to operate.

SUMMARY OF THE INVENTION

In accordance with the present invention, an apparatus for winding fishing line from a supply spool onto a crank-type fishing reel or, alternatively, onto a crankless fishing reel is provided. The apparatus includes a frame and supply spool support means for supporting the supply spool in a rotatable position on the frame. Reel winder means is provided on the frame for engaging and winding a crank-type reel in order to wind fishing line from the supply spool onto the crank-type reel or, alternatively, for engaging and winding a crankless reel to wind fishing line from the supply spool onto the crankless reel. Fishing reel support means is provided on the frame for supporting the respective crank-type or crankless fishing reel on the frame. For this purpose, the fishing reel support means includes a reel support member which is mountable on the frame in a first and second orientation. The reel support member is mountable on the frame in the first orientation to support a crank-type reel at the desired position on the frame in engagement with the reel winder means and is mountable on the frame in the alternative second orientation to support a crankless reel in a desired position on the frame in engagement with the reel winder means. Fishing line guide means is provided on the frame for guiding the fishing line from the supply spool onto the respective fishing reel supported on the frame.

DESCRIPTION OF THE DRAWINGS

The foregoing summary, as well as the following detailed description of the preferred embodiment of the present invention will be better understood when read in conjunction with the appended drawings, in which:

FIG. 1 is a perspective view of a preferred embodiment of an apparatus in position in accordance with the present invention for winding fishing line onto a crank-type fishing reel;

FIG. 4 is an exploded end elevational view of the reel support member in position for winding fishing line onto a crankless reel;

FIG. 5 an exploded end elevational view of the fishing reel support member and a retaining element illustrated in FIG. 4; and FIG. 6 is a side elevational view of the apparatus in accordance with the present invention having the reel support member disposed in the alternative orientation of FIGS. 4 and 5.

DESCRIPTION OF THE PREFERRED EMBODIMENTS

Figure 2:
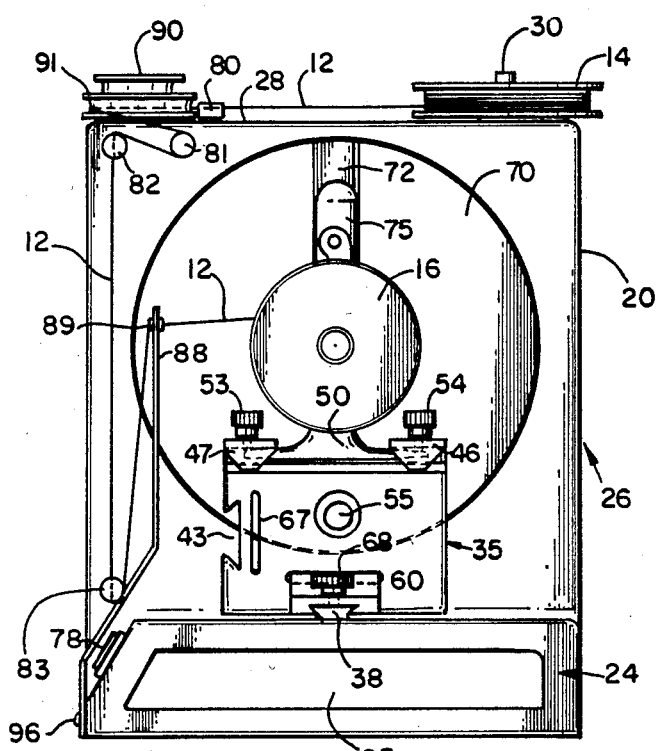
FIG. 2 is an end elevational view of the apparatus illustrated in FIG. 1.

Referring to the drawings and, particularly, to FIG. 1, an apparatus, generally designated 10, for winding fishing line 12 from a supply spool 14 onto a fishing reel 16 is depicted. The winder apparatus 10 includes a frame 20 having a base portion 24 for resting on a generally flat surface on which the fishing reel can be supported and a transversely disposed generally upright portion 26 on which the supply spool can be supported. The winder apparatus 10 is adaptable for use in winding fishing line onto either crank-type fishing reels, as depicted in FIG. 1, or crankless fishing reels, as depicted in FIG. 6.

As illustrated in FIG. 1, the line is drawn from a supply package, preferably a supply spool 14 of monofilament fishing line, which is supported on an upper surface 28 of the upright portion 26 of the frame. The supply spool 14 is removably mounted on a spindle 30 and rests upon the upper surface 28 in a freely rotatable position on spindle 30. As fishing line is drawn, the supply spool 14 rotates about the spindle 30.

Figure 3:
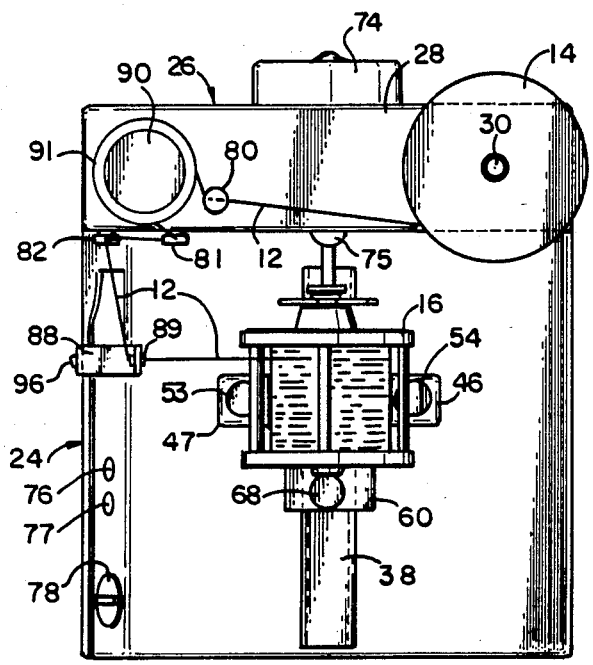
FIG. 3 is a plan view of the apparatus illustrated in FIG. 1.

The apparatus is adapted to feed fishing line from the supply package to a reel. As best illustrated in FIG. 1, from the supply spool 14, the fishing line is ultimately fed onto the crank-type fishing reel 16 supported on the base portion 24 of the frame. For this purpose, reel support means is provided for supporting the fishing reel at desired positions and locations along the base portion of the frame. In the present embodiment, the reel support means includes a generally rectangular reel support member 35, which is removably mountable on a guide track 38 provided on an upper surface 40 of the base portion 24 of the frame. The reel support member 35 functions to hold and support either a crank-type reel or a crankless reel at selected positions along the guide track. To accommodate reels of different axial length, the reel support member is moveable along the guide track. In the present embodiment, the guide track 38 is in the form of a dove-tailed guide rail which extends from one outer end of the base portion 24 of the frame toward the upright portion 26 at the opposite end of the frame. The reel support member 35 is mountable on and movable along guide track 38 in first and second alternative orientations. When the reel support member is mounted on the guide track in its first orientation, the reel support member is then properly positioned to hold and support a crank-type reel, as depicted in FIGS. 1, 2 and 3. Alternatively, when the reel support member is mounted on the guide track in its second orientation, the reel support member is then positioned to support a crankless reel, as depicted in FIGS. 4 to 6.

Means is provided to support the reel support member on the guide rail in a manner permitting movement thereon. The reel support member includes first and second track engaging dovetail slots 42 and 43, respectively, disposed along adjacent edges of the generally rectangular reel support member 35. The track engaging slots 42 and 43 are properly shaped and dimensioned to slide on the guide rail 38 so as to retain the reel support member on the guide rail while permitting movement of the reel support member longitudinally along the guide rail. The first track engaging slot 42 is disposed along one of the longer edges of the rectangular support member and functions to movably support the reel support member on the guide rail in the first orientation for holding a crank-type reel. Alternatively, the second track engaging slot 43 is disposed along one of the adjacent shorter edges of the rectangular support member and functions to movably support the reel support member on the guide rail in the second orientation for holding a crankless reel.

For the purpose of holding and supporting the fishing reels in proper position on the frame, the reel support member 35 includes first reel holder means for engaging and holding crank-type reels and second holder means for holding and supporting crankless reels. For this purpose, the first holder means includes a pair of retaining elements 46 and 47 which are slideably mounted on a retaining rail defined by a pair of grooves 49 along the longer edge of the rectangular reel support member opposite the track engaging slot 42. Sufficient clearance is provided between the retaining elements 46 and 47 and the edge of the reel support member 35 so that the retaining elements 46 and 47 can be slid over the conventional generally transverse base section 50 of the crank-type reel 16, as best illustrated in FIG. 1, and secured in position by means of thumb screws 52 and 53. The retaining elements 46 and 47 function to hold and support the crank-type reel on the reel support member when the reel support member is mounted on the guide rail 38 in the first orientation with the track engaging slot 42 engaging the guide rail 38. The displacement of the retaining elements 46 and 47 along the grooves 49 in the edge of the support member permit different sized crank-type reels to be mounted at selected positions thereon.

The reel support member also includes second reel holder means for holding and engaging a crankless reel when the reel support member is mounted on the guide rail in its second orientation. For this purpose, the second reel holder means includes a generally frusto-conical support element 55 which projects from one of the faces of the support member on a rotatable shaft 56 journaled within a bearing 57 (see FIG. 5). The support element 55 is freely rotatable and is of a conical shape with the apex projecting outwardly from the face of the support member 35 so that it may be inserted within an aperture provided on the side of a crankless reel, as illustrated in FIG. 6. The crankless reel may, for example, be the removable spool of a spinning reel.

The conical shape of the rotatable support element permits the support element to be snugly inserted into apertures of various sizes which are provided on the opposite sides of spinning reel spools. In this manner, spools of different sizes can be readily accommodated. The conical support element 55 functions to engage and rotatably support one side of the spinning reel spool when the support member 35 is disposed in its second orientation with track engaging slot 43 in engagement with guide rail 38, as shown in FIG. 6. Preferably the rotary axis of the support element is parallel to the guide rail 38.

To secure the support member at desired locations along guide rail 38, releasable retaining means is provided. For this purpose, a retaining element 60 which releasably engages the guide rail 38 and the reel support member 35 is employed. The retaining element has a rail-engaging dovetail slot 62 for insertion onto the guide rail 38. The rail engaging slot functions to retain the retaining element on the guide rail while permitting movement of the retaining element along the guide rail. To retain the reel support member in position, the retaining element includes a finger member 64 which is removably insertable into either one of a pair of apertures 66 and 67 provided on the reel support member 35 in the proximity of the track engaging slots 42 and 43 respectively. Aperture 66 provided in the vicinity of slot 42 is used when the reel support member 35 is mounted on the guide rail in the first orientation and aperture 67 provided in the vicinity of slot 43 is used when the reel support member is mounted in the second orientation. A thumb screw 68 is provided on the retaining element 60 for releasably engaging the guide rail 38 to secure the retaining element and the reel support member at selected locations along the guide rail 38.

In order to automatically wind either a crank-type reel or a crankless reel, reel winder means is provided. For this purpose, a motor-driven rotor for engaging and winding either a crank-type reel or a crankless reel is supported within a cavity provided within the upright portion of the frame. The rotary axis of the rotor is positioned so that it is parallel to the guide rail 38 and is aligned with the rotary axis of the support 55 when the member 35 is in the position shown in FIG. 6. The rotor element is recessed into the cavity to minimize the outward exposure of the motor-driven rotor. As depicted in FIG. 1, the rotor 70 is shaped in the form of a disc and is mounted and supported on motor shaft 72 which is rotationally driven by motor 74. To control operation of the motor, a stop button 76, a start button 77 and speed adjustment switch 78 provided on a control panel at the base portion of the frame are connected with the motor 74. Although the rotor 7 depicted as being mounted directly on motor shaft 71, indirect drive trains or gearing arrangements may also be used to rotationally drive the rotor 70.

The disc-shaped rotor 70 includes first winding means in the form of a longitudinal groove 72 extending across the diameter of the disc along the outwardly exposed generally planar disc face. The groove 72 is dimensioned and shaped to receive a handle 75 of a crank-type reel 16 and extends across the diameter of the disc face so that different-sized cranks of different-sized reels can be received within the groove 72. To automatically wind the crank-type reel 16, the reel is supported and held on the reel support member 35 which is positioned in its first orientation on guide rail 38. Preferably the central axis of the reel is aligned with the rotary axis of the rotor 70. The reel support member 35 is moved along the guide rail 38 to the selected position in which the handle 75 of the crank-type reel engages the rotor 70 and is snugly received within the accommodating groove 72, as depicted in FIGS. 1 and 3. Once moved to the desired position, the reel support member 35 is then secured in such position by tightening screw 68 provided on the retaining element 60. Depressing start switch 77 causes the motor to rotationally drive the rotor 70 thereby automatically winding the handle of the crank-type reel.

In order to convert the apparatus for use in winding crankless reels, retaining elements 46 and 47, which hold a crank-type reel in place, can be released so that the crank-type reel can be removed. Retaining element 60 which holds the support member 35 in place on the guide rail can then be released and removed from the guide rail 38. The reel support member can be removed from the guide rail and then rotated and reinserted onto the guide rail with track engaging slot 43 in engagement with the guide rail. Retaining element 60 can also be reinserted onto the guide rail so that the support member 35 can be secured at a selected position on the guide rail. If desired, the retainer 60 may be reversed and positioned between the support 35 and the upright portion 26, so that the finger 64 enters the aperture 66 or 67 from the opposite side, thereby enabling the support to be removed by simply releasing the retainer 60 without removing it.

For the purpose of winding crankless reels, such as the pick-up spool of a spinning reel, second winding means in the form of a conically-shaped support element 79 is provided at the center of the disc-shaped rotor 70 coaxial with the conical support 55. The conical support element 79 is fixed to the rotor 70 and is positioned with its apex extending outwardly away from the exposed face of the disc-shaped rotor. The conical support element 79 is provided for insertion into the aperture provided on the side of the pick-up spool of a spinning reel in order to support one side of the spool. The conical shape of the support element 79 renders the support self-centering and enables different sizes of spools having different sizes of apertures to be properly supported thereon with the axis of the spool aligned with the rotary axis of the rotor 70. Upon insertion into the aperture of the pick-up spool, the conical support element 79 functionally engages the spool to impart rotational movement to the spool whenever the rotor 70 is rotationally driven by motor 74.

When the reel support member is mounted on the guide rail in its second orientation so that it is in position to support a crankless reel, the conical support element 55 provided on the reel support member is positioned to oppose the conically-shaped support element 79 provided on the winding rotor 70. The opposing conical support elements 55 and 79 cooperate with one another and function to support the opposite sides of the crankless reel concentric with the rotary axis of the rotor 70, as depicted in FIG. 6. The conical shape of the support elements permit crankless reels having different sized apertures along their side walls to be properly engaged by the support elements for rotation therewith.

To properly guide the fishing line from the supply spool to the fishing reel mounted on the frame, guide means are provided on the frame intermediate the mounted supply spool and fishing reel. In the present embodiment, slotted guide elements 80, 81, 82 and 83 are mounted in fixed position on the upright portion of the frame. The slotted guide elements have channels or slots partially along their outer periphery for receiving the fishing line and thereby function to guide the fishing line along a predetermined path. Other types of guide elements, such as guide hooks, idler pulleys, or apertured elements, may also be used for guiding the fishing line from the supply spool to the reel.

To direct the fishing line onto the fishing reel, reciprocating means is employed which functions to reciprocate the fishing line across the length of the fishing reel as the fishing reel is being wound to insure that the fishing line is level wound onto the pick-up spool of the fishing reel. For this purpose, a guide arm 88 is pivotally mounted at 96 at one of its ends to the base portion of the frame so that the guide eye 89 at the other end of the guide arm 88 directly opposes the fishing reel mounted on the frame. The fishing line is directed through the guide eye 89, which functions to direct the fishing line onto the reel. As the fishing line is wound onto the reel, the guide arm is manually reciprocated about its pivot point 96 across the length of the fishing reel so that a level wind is formed on the reel. If desired, automatic level-wind mechanism may be incorporated in the apparatus.

In order to determine the length of the fishing line being wound onto the fishing reel, measuring means is provided on the frame intermediate the supply spool and the fishing reel. In the present embodiment, a pair of coaxially mounted rotatable pulleys 90 and 91 are mounted on the upper surface 28 of the upright portion of the frame. The rotatable pulleys are mounted between guide elements 80 and 81 and the element 80 may be adjusted vertically so that the fishing line can be properly directed onto and off of either one of the pulleys 90 and 91. From guide element 80, the fishing line is wound around either one of the rotatable pulleys and then directed to guide element 81. The pulleys are then rotated by the fishing line as it is wound onto the fishing reel. The rotatable pulleys have different diameters so that the length of fishing line wound onto the reel can be measured in different measuring units. For example, one pulley may have a diameter dimensioned in centimeters and the other a diameter dimensioned in inches. If the fishing line is wound around pulley 91 having the larger diameter, the number of rotations of the pulley may give the length of the fishing line in feet. Alternatively, if the fishing line is wound around the upper pulley having the smaller diameter, the number of rotations of the pulley may give the measurement of the fishing line in meters. Display means 93 in the form of a series of counter wheels visible through a display window on the upright portion of the frame is coupled with the rotatable pulleys so that the length of fishing line wound onto the fishing reel is displayed.

A cavity 95 is provided within the base portion of the housing for storage of the power cord for motor 74 when the apparatus is not in use. The cavity 95 also functions to provide ventilation to the motor when the apparatus is being used.

From the foregoing description and the accompanying drawings, it can be seen that the present invention provides an apparatus for winding fishing line onto either a crank-type reel or a crankless reel which is both convenient and easy to operate. It will be recognized by those skilled in the art that changes or modifications may be made to the above-described embodiment without departing from the broad, inventive concepts of the invention. It is understood, therefore, that the invention is not limited to the particular embodiment which is disclosed, but is intended to cover all modifications and changes which are within the scope and spirit of the invention as defined by the appended claims.

What is claimed is:

1. An apparatus for winding fishing line from a supply means onto either a crank-type fishing reel or a crankless fishing reel comprising:
   (a) a frame,
   (b) reel winder means on the frame for engaging and driving the reel to wind fishing line from the supply means onto the reel;
   (c) fishing reel support means for supporting the reel at a desired position in engagement with the reel winder means to drive the reel, said support means having a reel support member configured to be mounted on the frame in a first orientation for supporting a crank-type reel in engagement with the reel winder means and configured to be mounted on the frame in a second orientation for supporting a crankless reel in engagement with the reel winder means, said support member having first holder means positioned on said support member for releasably holding and supporting a crank-type reel in engagement with said winder means in the first orientation of the support member and second holder means positioned on said support member cooperable with said winder means for releasably holding and supporting a crankless reel on the reel support member in engagement with said winder means in the second orientation of the support member; and
   (d) fishing line guide means on the frame for guiding the fishing line from the supply means onto the fishing reel supported on the frame.

2. An apparatus for winding fishing line from a supply means onto either a crank-type fishing reel or a crankless fishing reel comprising:
   (a) a frame,
   (b) reel winder means on the frame for engaging and driving the reel to wind fishing line from the supply means onto the reel;
   (c) fishing reel support means for supporting the reel at a desired position in engagement with the reel winder means to drive the reel, said fishing reel support means having a guide track on the frame and a reel support member configured to be mounted on the frame in a first orientation for supporting a crank-type reel in engagement with the reel winder means and configured to be mounted on the frame in a second orientation for supporting a crankless reel in engagement with the reel winder means, said reel support member having first holder means for releasably holding and supporting a crank-type reel in engagement with said winder means; second holder means cooperable with said winder means for releasably holding and supporting a crankless reel on the reel support member in engagement with said winder means; and first and second guide track engagement means for engaging the guide track to support the reel support member on the frame, one of said engagement means adapted to mount the member in its first orientation so that the first holder means supports a crank-type reel in driving engagement with winder means and the other of said engagement means adapted to mount the reel support member in its second orientation so that the second holder means supports a crankless reel on the reel in driving engagement with the reel winder means; and
   (d) fishing line guide means on the frame for guiding the fishing line from the supply means onto the fishing reel supported on the frame.

3. An apparatus in accordance with claim 2 wherein the fishing reel support means includes retaining means engageable with the reel support member to retain a selected guide track engagement means engaged on the guide track.

4. The apparatus in accordance with claim 3 wherein the guide track is elongated and disposed parallel to a rotary axis of the reel mounted on said support member with said support member being mounted for movement along said track, and wherein the retaining means includes:
   a retaining element removably engageable with the support member and freely movable along the track; and
   a thumb screw provided on the retaining element for engaging the guide track to releasably retain the reel support member at a desired position along the guide track.

5. The apparatus in accordance with claim 1 wherein the reel winder means includes a rotor having first winding means positioned on said rotor for engaging and winding a crank-type reel and second winding means positioned on said rotor for engaging and winding a crankless reel.

6. The apparatus in accordance with claim 5 wherein the first winding means comprises a groove in the rotor for receiving and engaging a crank of the crank-type reel to rotatably drive the crank upon rotation of said rotor.

7. The apparatus in accordance with claim 5 wherein the second winding means includes a support element projecting from the rotor along the rotary axis for frictionally engaging the crankless reel to rotationally drive the crankless reel.

8. The apparatus in accordance with claim 1 wherein the reel winder means includes a rotor having a groove positioned on the rotor for receiving a crank of the crank-type reel to engage and rotatably drive the crank and the crank-type reel, and a support element positioned on the rotor projecting axially from said rotor for frictionally engaging a crankless reel to rotatably drive the crankless reel.

9. The reel winder means in accordance with claim 8 wherein the rotor comprises a motor-driven rotatable disc having at least one face with said groove extending across the diameter of the disc face so that different sized cranks can be received within the groove and wherein the projecting support element is a generally conical element provided in fixed position at the center of the disc face with the apex of the conical element extending outwardly from the face of the disc so that crankless reels with central apertures of different diameters can frictionally engage the conical element.

10. The apparatus in accordance with claim 9 wherein the frame includes a cavity and means for supporting the disc member in the cavity of the frame.

11. The apparatus in accordance with claim 1 wherein said fishing line guide means includes measuring means for counting the length of fishing line wound onto the reel.

12. The apparatus in accordance with claim 11 wherein the measuring means comprises:
    a pair of coaxially mounted rotatable pulleys having outer peripheral grooves for alternatively receiving the fishing line in driving engagement so that the pulleys are rotated by the fishing line as it is wound onto the fishing reel, said pulleys having different diameters to define a measured length of fishing line in different measuring units by a given rotation of the pulleys; and
    display means coupled with the rotatable pulleys for displaying the measured length of the fishing line wound onto the fishing reel.

13. The apparatus in accordance with claim 1 wherein said guide means includes means for reciprocating the fishing line across the respective fishing reel supported on the support member so that the apparatus provides a level wind of the fishing line on the fishing reel.

14. The apparatus in accordance with claim 13 wherein the means for reciprocating the fishing line includes a guide arm having one end pivotally mounted on the frame and having a guide eye at its other end for receiving and guiding the fishing line onto the fishing reel.

15. The apparatus in accordance with claim 2 wherein the reel winder means includes a rotor having first winding means for engaging and winding a crank-type reel and second winding means for engaging and winding a crankless reel.

16. The apparatus in accordance with claim 15 wherein the second winding means includes a first support element projecting from the rotor along its rotary axis for frictionally engaging one side of the crankless reel to rotationally drive the crankless reel to wind fishing line from the supply spool onto the crankless reel and wherein said second holder means includes a second support element opposing the first support element along the rotary axis for engaging and supporting an opposite side of the crankless reel in a freely rotatable manner so that the crankless reel is supported and suspended between the support elements and is rotationally driven by the first support element and is freely rotatable on the second support element.

17. An apparatus in accordance with claim 16 wherein the second holder means includes a bearing on the support member and the second support element includes a shaft journaled in the bearing and is freely rotational therewith.

18. The apparatus in accordance with claim 2 wherein the first track engagement means engages the guide track to support the reel support member in its first orientation and second track engagement means engages the guide track to support the reel support member in its second orientation.

19. The apparatus in accordance with claim 18 wherein the reel support member is generally rectangular and said first holder means and said first track engagement means are disposed along opposite edges of the reel support member.

20. The apparatus in accordance with claim 19 wherein the reel support member is generally rectangular and said second holder means is disposed along one of the faces of the reel support member and said second track engagement means is disposed along one of the edges of the reel support member.

21. The apparatus in accordance with claim 20 wherein the guide track comprises a guide rail; said first track engagement means comprises means defining a first track engaging slot for engaging the guide rail; and said second track engagement means comprises means defining a second track engaging slot for engaging the guide rail.

22. An apparatus for winding fishing line from a supply means onto either a crank-type fishing reel or a crankless fishing reel comprising:
    (a) a frame,
    (b) reel winder means on the frame for engaging and driving the reel to wind fishing line from the supply means onto the reel, the reel winder means including a rotor having a diametric groove for receiving a crank of the crank-type reel to engage and rotatably drive the crank and the crank-type reel, and a support element projecting axially from said rotor for frictionally engaging a crankless reel to rotatably drive the crankless reel;
    (c) fishing reel support means for supporting the reel at a desired position in engagement with the reel winder means to drive the reel, said support means having a reel support member configured to be mounted on the frame in a first orientation for supporting a crank-type reel in engagement with the reel winder means and configured to be mounted on the frame in a second orientation for supporting a crankless reel in engagement with the reel winder means; and (d) fishing line guide means on the frame for guiding the fishing line from the supply means onto the fishing reel supported on the frame.

23. The reel winder means in accordance with claim 22 wherein the rotor comprises a motor-driven rotatable disc having at least one face with said groove extending across the full diameter of the disc face so that different sized cranks can be received within the groove and wherein the projecting support element is a generally conical element provided in fixed position at the center of the disc face with the apex of the conical element extending outwardly from the face of the disc so that crankless reels with central apertures of different diameters can frictionally engage the conical element.

24. The apparatus in accordance with claim 23 wherein the frame includes a cavity and means for supporting the disc member within the cavity of the frame.

25. An apparatus in accordance with claim 22 wherein said fishing line guide means includes measuring means for counting the length of fishing line wound onto the reel, the measuring means comprising a pair of coaxially mounted rotatably pulleys having outer peripheral grooves for alternatively receiving the fishing line in driving engagement so that the pulleys are rotated by the fishing line as it is wound onto the fishing reel, said pulleys having different diameters to define a measured length of fishing line in different measuring units by a given rotation of the pulleys, and display means coupled with the rotatably pulleys for displaying the measured length of the fishing line wound onto the fishing reel.

* * * * *